United States Patent [19]

Hayashi et al.

[11] Patent Number: 4,892,912
[45] Date of Patent: Jan. 9, 1990

[54] PROCESS FOR PRODUCING AROMATIC POLYESTER

[75] Inventors: Hideo Hayashi; Hideya Murai; Nobuyuki Inaba, all of Sodegaura, Japan

[73] Assignee: Idemitsu Petrochemical Co., Ltd., Tokyo, Japan

[21] Appl. No.: 268,695

[22] Filed: Nov. 8, 1988

[51] Int. Cl.$^4$ .............................................. C08F 20/00
[52] U.S. Cl. ........................... 525/437; 525/448; 528/272; 528/302; 528/305; 528/308.2; 528/486; 528/497; 528/503
[58] Field of Search ................ 525/437, 448; 528/272, 528/302, 305, 308.2, 486, 497, 503

[56] References Cited

U.S. PATENT DOCUMENTS

| | | | |
|---|---|---|---|
| 4,107,143 | 8/1978 | Inata et al. | 528/176 |
| 4,473,682 | 9/1984 | Calundann et al. | 524/605 |
| 4,663,422 | 5/1987 | Inoue et al. | 528/176 |
| 4,719,171 | 1/1988 | Ikenaga et al. | 430/271 |
| 4,726,998 | 2/1988 | Ikenaga et al. | 428/480 |
| 4,737,398 | 4/1988 | Ikenaga et al. | 428/216 |
| 4,758,242 | 7/1988 | Ueno et al. | 8/115.69 |
| 4,772,421 | 9/1988 | Ikenaga et al. | 252/500 |
| 4,772,422 | 9/1988 | Hijikata et al. | 252/511 |
| 4,777,204 | 10/1988 | Ikenaga et al. | 524/439 |

FOREIGN PATENT DOCUMENTS 0196785 10/1986 European Pat. Off. .
0252415 1/1988 European Pat. Off. .
2525092 12/1975 Fed. Rep. of Germany .
63-66223 3/1988 Japan .

OTHER PUBLICATIONS

Patent Abstracts of Japan, vol. 7, No. 181 (C-180) (1326) 10th Aug. 1983; & JP-A-58 84821 (Asahi Kasei Kogyo K.K.).
Patent Abstracts of Japan, vol. 7, No 181 (C-180) (1326) 10th Aug. 1983; & JP-A-58 84821 (Asahi Kasei Kogyo K.K.).

*Primary Examiner*—John Kight
*Assistant Examiner*—Samuel A. Acquah
*Attorney, Agent, or Firm*—Frishauf, Holtz, Goodman & Woodward

[57] ABSTRACT

A process for producing aromatic polyester which comprises mixing
5 to 70 mol % (as calculated by converting the repeating unit mentioned below into one molecule) of polyester (A) with the repeating unit represented by general formula (I),

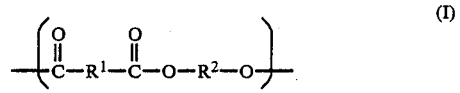

and 95 to 30 mol % of an acyloxyl aromatic carboxylic acid (B),
with 0.1 to 20 mol % based on the total amount of (A) and (B), of a diacyloxy aromatic compound (C) represented by general formula (II),

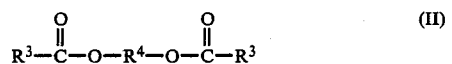

and reacting the resulting mixture.

The aromatic polyester is excellent in elasticity and mechanical strength, as well as toughness.

5 Claims, No Drawings

PROCESS FOR PRODUCING AROMATIC POLYESTER

BACKGROUND OF THE INVENTION

1. Field of the Invention

The present invention relates to a process for producing aromatic polyesters. More particularly, the present invention relates to a process for producing liquid-crystalline aromatic polyesters useful as raw materials for fiber, film and injection-molded parts, as well as covering material for optical fibers, because the polyesters have high elasticity, mechanical strength and toughness.

2. Description of the Related Art

Since aromatic polyester forming liquid crystal has a low coefficient of linear expansion, high elasticity and high strength, attention is paid to its various uses including covering material for optical fibers.

Regarding processes for producing such aromatic polyesters, a process in which polyester such as polyethylene terephthalate and polybutylene terephthalate is acid-decomposed with an acyloxy aromatic carboxylic acid such as p-acetoxy benzoic acid to produce polyester fragments and then the resulting fragments are copolymerized, is generally well-known (See Japanese Patent Publication No.18016/1981.)

In the process mentioned above, however, a large amount of insoluble, infusible matter regarded as a self-condensate of acyloxy aromatic carboxylic acid is undesirably generated. Therefore, the aromatic polyester has problems such as poor uniformity and inferior mechanical properties.

SUMMARY OF THE INVENTION

An object of the present invention is to provide aromatic polyesters having excellent uniformity and high mechanical strength.

Another object of the present invention is to provide liquid-crystalline aromatic polyesters containing few insoluble, infusible particles.

A further object of the present invention is to provide aromatic polyesters which can be used as superior materials for covering material of optical fiber, fiber, film and injection-molded parts.

According to the present invention these and still other objects are attained by providing a process for producing aromatic polyester which comprises: mixing 5 to 70 mol % [as calculated by converting the repeating unit mentioned below into one molecule) of polyester (A) with the repeating unit represented by general formula (I),

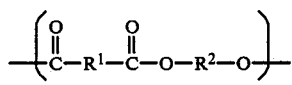  (I)

and 95 to 30 mol % of an acyloxyl aromatic carboxylic acid (B),
with 0.1 to 20 mol% based on the total amount of (A) and (B), of a diacyloxy aromatic compound (C) represented by general formula (II),

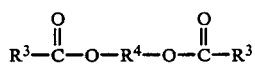  (II)

and reacting the resulting mixture;

wherein $R^1$ represents an aromatic bivalent radical with 6 to 20 carbon atoms, $R^2$ is selected from the group of an aliphatic bivalent radical with 2 to 20 carbon atoms, an alicyclic bivalent radical with 4 to 20 carbon atoms, an aromatic bivalent radical with 6 to 20 carbon atoms and poly(alkylene oxide) bivalent radical with a molecular weight of 200 to 8000, $R^3$ represents an alkyl radical with 1 to 8 carbon atoms, and $R^4$ is selected from the group of

,

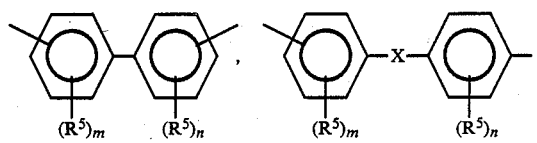

and

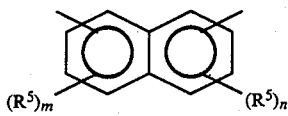

(wherein $R^5$ is selected from the group of a hydrogen atom, a halogen atom, an alkyl radical with 1 to 4 carbon atoms and an alkoxy radical with 1 to 4 carbon atoms, m and n are independently an integer of 1 to 4, and —(CH group X —CH(CH$_3$)—, —CH(C$_2$H$_5$)—, —CH(CH$_3$)$_2$—, —CH(C$_2$H$_5$)$_2$—, —O—,

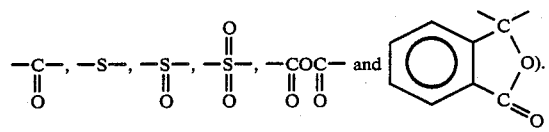

DESCRIPTION OF PREFERRED EMBODIMENTS

Polyester (A), a raw material of the aromatic polyester of the present invention, is produced according to a conventional process, that is; the condensation reaction of a dicarboxylic acid with an diol described later herein. This polyester (A) has a repeating unit represented by general formula (I). $R^1$ and $R^2$ in general formula (I) are as described above. Among them,

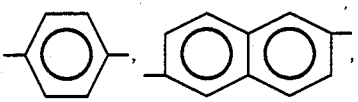

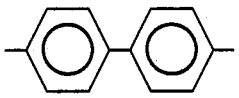

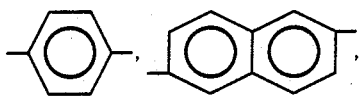

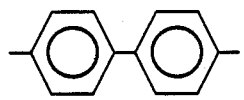

are preferred for $R^1$, and $-C_2H_4-$, $-C_4H_8-$, are preferred for $R^2$.

Preferable examples of polyesters (A) include polyethylene terephthalate, polubutylene terephthalate, poly-p-phenylene terephthalate and polyethylene naphthalate.

The dicarboxylic acids which can be used to produce polyesters (A) in the present invention include, for example; malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelainic acid, sebacic acid, suberic acid, 1,3-chclopentanedicarboxylic acid, 1,4-cyclohexanedicarboxylic acid, terephthalic acid, isophthalic acid, 4-methylisophthalic acid, t-butylisophthalic acid, 2,5-norbornanedicarboxylic acid, 1,4-naphthalic acid, diphenic acid, 4,4'-oxydibenzoic acid, 4,4'-methylenedibenzoic acid, diglycolic acid, thiodipropionic acid, 4,4'-sulfonyldibenzoic acid, 2,5-naphthalenedicarboxylic acid, 2,6-naphthalenedicarboxylic acid, dibenzoic acid, bis(p-carboxyphenyl)methane, p-oxy(p-carboxyphenyl)benzoic acid, ethylene-bis(p-oxybenzoic acid), ethylene-bis-p-benzoic acid, tetramethylene-bis(p-oxybenzoic acid) and 1,5-naphthalenedicarboxylic acid. The ester-forming derivatives which can be used include esters such as methyl, ethyl and phenyl ester as well as ethyleneglycol ester of various monomers. These esters include, for example, di-methyl-1,4-cyclohexanedicarboxylate, dimethyl-2,6-naphthalenedicarboxylate, dimethyl-4,4'-sulfonyldibenzoate, dimethyl isophthalate, dimethyl terephthalate and diphenyl terephthalate. Two or more of the above dicarboxylic acids or esters thereof can be employed to produce copolymerized polyesters. The other derivatives can be employed to produce polyesters(A).

On the other hand, the diols which can be used to produce polyesters (A) in the present invention include, for example; ethylene glycol, diethylene glycol, 1,2-propylene glycol, 2,4-dimethyl-2-ethylenehexane-1,3-diol, 2,2,4-trimethyl- 1,3-pentanediol, 2,2-dimethyl-1,3-propanediol, 1,3-butanediol, 1,4-butanediol, 1,5-pentanediol, 1,6-hexanediol, 2,2,4-trimethyl-1,6-hexanediol, 1,4-cryclohexanediol, 1,4-cyclohexanedimethanol, p-xylenediol, 4,4'-thiodiphenol, 4,4'-methylenediphenol, 4,4'-dihydroxybiphenyl, hydroquinone, resorcinol, 4,4'-sulfonyldiphenol, 4,4'-oxydiphenol, 4,4'-isopropylidenediphenol (it may be referred to as bisphenol A), 4,4'-isopropylidenebis(2,6-dichlorophenol), 4,4'-cyclohexylidenediphenol, 4,4'-(2-norbornylidene)diphenol, 4,4'-(hexahydro-4,7-methanoindane-5-ylidene)-diphenol, 2,5-naphthalenediol and 2,5-norbornanediol. Two or more of the above described diols can be employed to produce copolymerized polyesters. Other dihydric phenols which can be used, include those which are described in the U.S. Pat. No. 3,030,335 and 3,317,466. Two or more of the above described dicarboxylic acids and/or diols can also be employed to produce copolymerized polyesters.

Other diols include poly(alkylene oxide) glycols well-known in the industry and disclosed in the U.S. Pat. No. 3,023,192. The poly(alkylene oxide) glycols are represented by a general formula, $$HO-(RO)_k-H,$$

wherein R represents an alkylene bivalent radical with 2 to 4 carbon atoms and k represents a positive integer providing the bivalent poly(alkylene oxide) radical with a molecular weight of approximately 200 to 8000.

Typical poly(alkylene oxide)glycols include poly (ethylene oxide)glycol, poly(propylene oxide)glycol, poly (tetramethylene oxide)glycol and a mixture thereof. Both poly(alkylene oxide)glycol with a single molecular weight and a mixture of low- and high-molecular weight poly(alkylene oxide)glycols or that of poly(alkylene oxide)glycols with several degrees of molecular weight may be also used. The amount of bivalent poly(alkylene oxide) radical can be generally controlled within the range from 5 to 90 wt % to the total amount of bivalent radical produced from the diol.

A favorable poly(alkylene oxide) glycol is poly(tetramethylene oxide) glycol because the copolymerized polyester produced from the glycol has preferable elasticity.

Pluronic L-35 (manufactured by Wyandotte Chemical Co.), which can be also used as poly(alkylene oxide) glycol, is a hydroxyl-radical terminated blockcopolymer with a molecular weight of 1900 composed of; approximately 25 wt % of the first block of poly(oxyethylene) alcohol, approximately 50 wt % of the second block of poly(oxypropylene) and approximately 25 2-wt % of the third block of poly(oxyethylene) alcohol.

Although poly(alkylene oxide) glycols with a molecular weight of 200 to 8000 can be generally used, those with a molecular weight of 1000 to 4000 are preferable.

The molecular weight of polyester (A) in the present invention has no limitation. However, polyester (A) having inherent viscosity of 0.05 to 1.5 dl/g, particularly 0.1 to 1.0 dl/g at 30° C in an equal weight mixed solvent of tetrachloroethane and phenol is preferable.

Acyloxy aromatic carboxylic acid (8) used in the present invention includes various compounds with the following general formulas (III) through (VI):

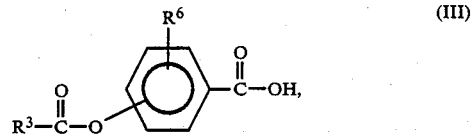 (III)

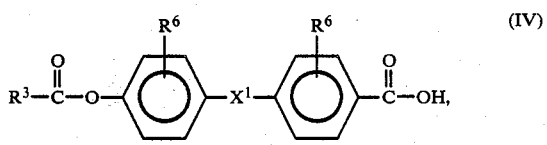 (IV)

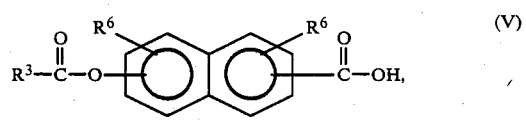 (V)

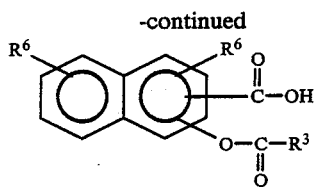

wherein $R^3$ is the same as defined above, $R^6$ is selected from the group of a hydrogen atom, a halogen atom, and an alkyl or alcoxy radical with 1 to 4 carbon atoms, and $X^1$ is selected from the group of a direct bond, —$CH_2$—, —$(CH_2)_2$—, —$CH(CH_3)$—, $CH(C_2H_5)$—, —$C(CH_3)_2$—, —O—S— and —$SO_2$—.

Methyl, ethyl and phenyl radicals are favorable for $R^3$ and a hydrogen atom, methyl radical and ethyl radical are favorable for $R^6$. The direct bond and —$C(CH_3)_2$— are favorable for $X^1$.

Acyloxy carboxylic acid (B) in the present invention includes acetoxy benzoic acid, propionyloxy benzoic acid, butylyloxy benzoic acid and isobutylyloxy benzoic acid. Any acyloxy carboxylic acids with the acyloxy radical positioning at ortho, meta or para may be used, but those with the acyloxy radical positioning at para are most favorable.

Acyloxy carboxylic acid (B) is used at a ratio of 95 to 30 mol %, preferably 90 to 40 mol %, to the total amount of polyester (A) (as calculated by converting the repeating unit in the general formula (I) into one molecule) and acyloxy carboxylic acid (B). When the amount of acyloxy carboxylic acid deviates from the range mentioned above, the product shows disadvantages such as the disappearance of melt anisotropy and poor moldability.

The diacyloxy aromatic compound (C) in the present invention is a compound represented by the following general formula (II) as mentioned previously:

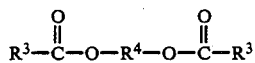

When $R^4$ represents

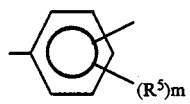

($R^5$ and m are the same as defined above), the diacyloxy aromatic compound includes 1,4-diacetoxy benzene, diacetoxy toluene, diacetoxy chlorobenzene and diacetoxy methoxy benzene.

When $R^4$ is a radical represented by the formula:

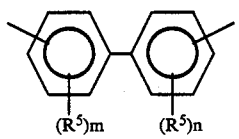

(wherein $R^5$, m and n are the same as defined above), the diacyloxy aromatic compound includes, for example; 4,4'-diacetoxybiphenyl, 2,2'-dimethyl-4,4'-diacetoxybiphenyl and 3,3'-dimethoxy-4,4'-diacetoxybiphenyl.

When R4 is a radical represented by the formula:

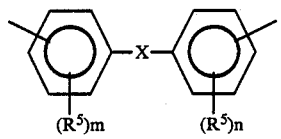

(wherein $R^5$, X, m and n are the same as defined above), the diacyloxy aromatic compound includes, for example; bis(4-acetoxyphenyl)methane, bis(4-acetoxyphenyl)ethane, 2,2-bis(4-acetoxyphenyl)propane, 4,4'-diacetoxydiphenylether, 4,4'-diacetoxybenzophenone, 4,4'-diacetoxy-diphenylsulfide, 4,4'-diacetoxydiphenylsulfoxide, 4,4'-diacetoxy-diphenylsulfone, p-acetoxybenzoic acid anhydride, phenolphthalein diacetate, 4,4'-dimethoxy-3,3'-diacetoxy-diphenylether, 2,4'-dichloro-3,3'-diacetoxydiphenylether, 4,4'-diacetoxy-3,3',5,5'-tetramethyldiphenylsulfone.

When $R^4$ is a radical represented by the formula:

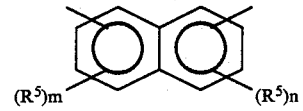

(wherein $R^5$ m and n are the same as defined above), the diacyloxy aromatic compound includes, for example; 1,4-diacetoxynaphthalene, 1,5-diacetoxynaphthalene, 1,6-diacetoxynaphthalene, 2,7-diacetoxynaphthalene, 1-chloro-2,6-diacetoxynaphthalene, 1-methyl-2,6-diacetoxynaphthalene and 1-methoxy-2,6-diacetoxynaphthalene.

Above all, 1,4-diacetoxybenzene, 4,4'-diacetoxybiphenyl, 4,4'-diacetoxybenzophenone, 4,4'-diacetoxydiphenylsulfone, 2,2-bis(4-acetoxyphenyl)propane, p-acetoxybenzoic acid anhydride or phenolphthalein diacetate is preferable.

A single diacyloxy aromatic compound or a mixture of two or more diacyloxy aromatic compounds can be used in the present invention.

A diacyloxy aromatic compound (C) mentioned above is used at a ratio of 0.1 to 20 mol %, preferably 1 to 10 mol %, to the total amount of polyester (A) and acyloxy aromatic carboxylic acid (B). When the amount of diacyloxy aromatic compound (C) used is less than 0.1 mol %, then insoluble, infusible particles are generated in such quantities that uniformity of the product decreases and toughness or flexibility is hardly improved If the amount of the compound (C) used exceeds 20 mol %, then the polymerization reaction does not proceed efficiently.

According to the present invention, polyester (A), acyloxy aromatic carboxylic acid (B) and a diacyloxy aromatic compound (C) mentioned above are mixed at ratios mentioned above and reacted under appropriate conditions. For instance, a mixture of those compounds are reacted while stirring at a temperature of 150 to 400° C for 10 minutes to 24 hours, preferably at a temperature of 250 to 350° C for 30 minutes to two hours, in an inert gas atmosphere to produce polyester fragments.

The polyester fragments thus produced are further reacted while stirring at a temperature of 200 to 450° C for 5 minutes to 24 hours under a vacuum of 50 mmHg or less, preferably at a temperature of 275 to 320° C for 1 to 8 hours under a vacuum of 1 mmHg or less.

In the reaction, acyloxy aromatic carboxylic acid (B) and diacyloxy aromatic compound (C) are considered to be concurrently combined with polyester (A) polymer in various forms, namely; compounds (B) and (C) are taken up into the main chain of polymer (A) or respective polymers and copolymer of acyloxy aromatic carboxylic acid (B) and diacyloxy aromatic compound (C) are combined with the main chain of polyester (A).

According to the present invention, almost no insoluble, infusible matter is formed, so a liquid-crystalline aromatic polyester with high uniformity and mechanical strength can be produced.

The aromatic polyester is also excellent in elasticity and mechanical strength, as well as toughness.

Accordingly, the aromatic polyester produced according to the present invention is effectively used as a superior material for fiber, film and injection-molded parts, as well as covering material for optical fibers.

The present invention will now be further illustrated by certain examples and references which are provided for purposes of illustration only and are not intended to limit the present invention.

Melt index (MI) of polymer is measured at 30° C with melt indexer P-01 of Toyo Seiki using the following test loads:
325 g load for a composition ratio of 60 mol % of p-acetoxy benzoic acid to 40 mol % of polyethylene terephthalate, and 2160 g load for the composition ratios of 80 and 40 mol % of p-acetoxy benzoic acid and 20 and 60 mol % of polyethylene terephthalate, respectively.

EXAMPLE 1

A mixture of 76.87 g (0.40 mol) of polyethylene terephthalate having inherent viscosity of 0.68 dl/g, 108.1 g (0.60 mol) of p-acetoxy benzoic acid and 59.35 g (0.19 mol) of 2,2-bis(4-acetoxyphenyl)propane was place into a 500 ml flask equipped with a vacuum stirrer, a short distilling column and an inlet for nitrogen. Said flask was evacuated and purged with nitrogen gas three times, and then dried at 100° C under 2 mmHg for 30 minutes. Subsequently, the mixture in the flask was stirred in an atmosphere of nitrogen gas at 275° C for one hour. Acetic acid was distilled away gradually from the flask, to obtain a polyester fragment having a low melting viscosity.

Said polyester fragment was polymerized while stirring at 275° C under a vacuum of 0.05 mmHg for 8.5 hours, to obtain an opaque white aromatic polyester with a high melting viscosity. The melt index (MI) of the resulting aromatic polyester was 25.3 g/10 minutes.

EXAMPLE 2

The procedure of Example 1 was repeated except that 20.88 g (0.070 mol) of 4,4'-diacetoxybenzophenone was used instead of 59.35 g (0.19 mol) of 2, 2'-bis(4-acetoxyphenyl)propane and that the period of polymerizing the polyester fragment was 5 hours, to obtain an aromatic polyester having MI of 3.22g/10 minutes.

EXAMPLE 3

The procedure of Example 1 was repeated except that 3.88 g (0.02 mol) of 1,4-diacetoxybenzene was used instead of 59.35 g (0.19 mol) of 2,2-bis(4-acetoxyphenyl)propane and that the period of polymerizing the polyester fragment was 4.5 hours, to obtain an aromatic polyester having MI of 2.40 g/10 minutes.

EXAMPLE 4

The procedure of Example 1 was repeated except that 13.51 g (0.05 mol) of 4,4'-diacetoxybiphenyl was used instead of 59.35 g (0.19 mol) of 2,2-bis(4-acetoxyphenyl)propane and that the period of polymerizing the polyester fragment was 5 hours, to obtain an aromatic polyester having MI of 5.50 g/10 minutes.

EXAMPLE 5

The procedure of Example 1 was repeated except that 3.42 g (0.01 mol) of p-acetoxy benzoic anhydride was used instead of 59.35 g (0.19 mol) of 2,2-bis(4-acetoxyphenyl) propane and that the period of polymerizing the polyester fragment was 6.0 hours, to obtain an aromatic polyester having MI of 10.0 g/0 minutes.

COMPARATIVE EXAMPLE 1

The procedure of Example 1 was repeated except that 59.35 g (0.19 mol) of 2,2-bis(4-acetoxyphenyl)propane was not added, and that the polymerization period of the polyester fragment was 5 hours, to obtain an aromatic polyester having MI of 123 g/10 minutes.

EXAMPLE 6

A mixture of 38.43 g (0.20 mol) of polyethyleneterephthalate having inherent viscosity of 0.68 dl/g, 144.1 g (0.80 mol) of p-acetoxy benzoic acid and 9.71 g (0.05 mol) of 1,4-diacetoxybenzene was placed into 500 ml flask equipped with a vacuum stirrer, a short distilling column and an inlet for nitrogen. Said flask was evacuated and purged with nitrogen gas three times, and then dried at 100° C, under 2 mmHg for 30 minutes. Subsequently, the mixture in the flask was stirred in an atmosphere of nitrogen gas at 300° C for an hour. Acetic acid was distilled away gradually from the flask, and polyester fragment having low melting viscosity was obtained.

Said polyester fragment was polymerized while stirring at 300° C under 0.05 mm Hg for 2.5 hours, to obtain an opaque white aromatic polyester having a high melting viscosity. The MI of the resulting aromatic polyester was 0.005 g/10 minutes.

EXAMPLE 7

The procedure of Example 6 was repeated except that 0.40 g (0.001 mol) of phenolphthalein diacetate was used instead of 9.71 g (0.05 mol) of 1, 4-diacetoxybenzene, and that the period of polymerizing the polyester fragment was 3.5 hours, to obtain an aromatic polyester having MI of 0.008 g/10 minutes.

EXAMPLE 8

The procedure of Example 6 was repeated except that 10.81 g (0.04 mol) of 4,4'-diacetoxybiphenyl was used instead of 9.71 g (0.05 mol) of 1,4-diacetoxybenzene and that the period of polymerizing the polyester fragment was 2 hours, to obtain an aromatic polyester having MI of 0.008 g/10 minutes.

EXAMPLE 9

The procedure of Example 6 was repeated except that 61.85 g (0.185 mol) of 4,4'-diacetoxydiphenylsulfone was used instead of 9.71 g (0.05 mol) of 1,4-diacetoxybenzene, and that the period of polymerizing the polyester fragment was 5.5 hours, to obtain an aromatic polyester having MI of 0.015 g/10 minutes.

COMPARATIVE EXAMPLE 2

The procedure of Example 6 was repeated except that 9.71 g (0.05 mol) of 1,4-diacetoxybenzene was not added, and that the period of polymerizing the polyester fragment was 2 hours, to obtain an aromatic polyester having MI of 25 g/10 minutes.

EXAMPLE 10

The procedure of Example 1 was repeated except that 115.3 g (0.60 mol) of polyethylene terephthalate having inherent viscosity of 0.68 dl/g, 77.68 g (0.40 mol) of p-acetoxy benzoic acid, and 8.95 g (0.03 mol) of 4,4'-diacetoxybenzophenone were used as the starting materials and that the period of the polymerizing polyester fragment was 5 hours, to obtain an aromatic polyester having MI of 280 g/10 minutes.

EXAMPLE 11

The procedure of Example 10 was repeated except that 0.625 g (0.002 mol) of 2,2-bis(4-acetoxyphenyl)propane was used instead of 8.95 g (0.03 mol) of 4,4'-diacetoxy-benzophenone, and that the period of polymerizing the polyester fragment was 6 hours, to obtain an aromatic polyester having MI of 220 g/10 minutes.

COMPARATIVE EXAMPLE 3

The procedure of Example 10 was repeated except that 8.95 g (0.03 mol) of 4,4'-diacetoxybenzophenone was not added, to obtain an aromatic polyester having MI of 1500 g/10 minutes.

Evaluation Test

The content of insoluble matter, tensile strength and inherent viscosity of the polyesters produced in the Examples and the Comparative Examples are measured by the following methods and the results are shown in Table 1 along with the MI of the polyesters.

(1) Molding Method

Aromatic polyester produced in the Examples and the Comparative Examples were extruded into strands at a temperature of 270 to 300° C, and the resulting strands were cut into pellets. Successively, the pellets thus produced were spun into fiber with a diameter of 0.5 mm by a melt spinning machine of Japan Rheology Co.

Present Conditions:
Molding temperature: 270 to 320° C
Shear rate: 40 sec$^{-1}$
Diameter of die: 2 mm
L/D: 20

(2) Determining Method Of Insoluble Matter

Two grams of the polymer was weighed out and dissolved in 200 ml of p-chlorophenol at 130° C. The insoluble matter was separated by a centrifugal separator (CM-60RN Type of TOMY SEIKO) at 9000 rpm and dried at 130° C. The dried material was weighed to calculate its weight percentage.

(3) Measurement Of Tensile Strength

The tensile strength of the fiber with a diameter of 0.5 mm was measured with a tensile testing machine (DSC-2000 of Shimadzu Seisakusho) under condition of a temperature of 23° C, a stress rate of 5 mm/min and the distance between clamps at 100 mm.

(4) Measurement Of Inherent Viscosity

Solvent: Phenol/Tetrachloroethane (1/1 weight ratio)
Concentration: 0.5 g/dl
Temperature: 30° C

TABLE 1

| No. | MI (g/min) | Content of* insoluble component (% by weight) | Tensile strength (MPa) | Inherent viscosity of polyester |
|---|---|---|---|---|
| Example 1 | 25.3 | 0.028 | 410 | 0.95 |
| Example 2 | 3.22 | 0.032 | 550 | 1.20 |
| Example 3 | 2.40 | 0.073 | 490 | 1.25 |
| Example 4 | 5.55 | 0.045 | 510 | 1.03 |
| Example 5 | 10.0 | 0.087 | 475 | 0.99 |
| Comaparative Example 1 | 123 | 0.23 | 241 | 0.70 |
| Example 6 | 0.005 | 0.47 | 421 | 1.32 |
| Example 7 | 0.008 | 0.83 | 400 | 1.25 |
| Example 8 | 0.008 | 0.53 | 420 | 1.30 |
| Example 9 | 0.015 | 0.20 | 390 | 1.20 |
| Comparaative Example 2 | 25 | 3.7 | 130 | 0.75 |
| Example 10 | 280 | 0.023 | 375 | 0.95 |
| Example 11 | 220 | 0.051 | 390 | 1.00 |
| Comparative Example 3 | 1500 | 0.10 | 210 | 0.62 |

* As the result of testing the temperature dependency with observing the insoluble component by the use of polarizing microscope manufactured by Nippon Kogaku Co., Ltd. equipped with the hot stage manufactured by Linkam Co., Ltd., no melting was observed even when the temperature exceeds the melting point of the polymer by several ten ° C; so it was clear that the said insoluble component was infusible.

The results given in Table 1 shows that the polymers obtained according to Examples have lower melt index, smaller amounts of insoluble or infusible components, and remarkably higher tensile strength, than those of the case where diacyloxy aromatic compound was not added (Comparative Examples).

EXAMPLE 12

(1) Producing Aromatic Polyester

A mixture of 80 g (0.416 mol) of polyethylene terephthalate having inherent viscosity of 0.68 (hereinafter referred to as $A_1$), 105.4 g (0.585 mol) of p-acetoxy benzoic acid (hereinafter referred to as $B_1$) and 7.0 g (0.036 mol) of 1,4-diacetoxybenzene (hereinafter referred to as $C_1$) was placed into a 500 ml flask equipped with a stirrer, a short distilling column, and an inlet for nitrogen. Said flask was evacuated and purged with nitrogen gas three times, and then put into a wood metal bath maintained at 275° C. Subsequently, the mixture in the flask was dried at 110° C under 2 mmHg for 30 minutes, and then stirred in an atmosphere of nitrogen gas at 275° C. Acetic acid was distilled away gradually from the flask, to obtain a polyester fragment having a low melting viscosity. After that, the resulting fragment was stirred at a temperature of 275° C under vacuum of 0.05 mmHg for 4 hours. An opaque white aromatic polyester having a high melting viscosity was obtained. The inherent viscosity of the resulting aromatic polyester was 1.08.

Herein, the inherent viscosity is the viscosity at 30° C of a solution with a concentration of 0.5 g/dl using an equal weight mixed solvent of phenol and tetrachloroethane.

(2) Evaluation Test

The aromatic polyester produced as mentioned above was extruded into strands and the resulting strands were cut into pellets. The resulting pellets were spun into fiber having a diameter of 0.4 mm under a condition of a temperature of 270° C, a shear rate of 70 sec$^{-1}$, die of 2 mm in diameter and L/D of 20, using a melt spinning machine of Japan Rheology Co.

benzene were used in the prescribed amounts, and the resulting aromatic polyester was evaluated. The results are shown in Table 2.

COMPARATIVE EXAMPLE 4

An aromatic polyester was produced in the same manner as in Example 12 except that 1,4-diacetoxy benzene was not added. The resulting aromatic polyester was evaluated. The results are shown in Table 2.

TABLE 2

| No. | Polyester (A) Kind | Polyester (A) Mol | Polyester (A) Mol % | Acyloxy aromatic carboxylic acid (B) Kind | Acyloxy aromatic carboxylic acid (B) Mol | Acyloxy aromatic carboxylic acid (B) Mol % | Diacyloxy aromatic compound (C) Kind | Diacyloxy aromatic compound (C) Mol | Diacyloxy aromatic compound (C) Mol % |
|---|---|---|---|---|---|---|---|---|---|
| Example 12 | $A_1$ | 0.415 | 41.5 | $B_1$ | 0.585 | 58.5 | $C_1$ | 0.036 | 3.60 |
| Example 13 | $A_1$ | 0.400 | 41.5 | $B_1$ | 0.565 | 58.5 | $C_2$ | 0.035 | 3.62 |
| Example 14 | $A_1$ | 0.412 | 42.5 | $B_1$ | 0.555 | 57.5 | $C_3$ | 0.033 | 3.41 |
| Comparative Example 4 | $A_1$ | 0.415 | 41.5 | $B_1$ | 0.585 | 58.5 | — | — | — |
| Example 15 | $A_1$ | 0.415 | 41.5 | $B_1$ | 0.585 | 58.5 | $C_1$ | 0.004 | 0.40 |

| No. | Inherent viscosity of aromatic polyester | Modulus in tension (GPa) | Tensile strength (MPa) | Knot strength (MPa) | Loop strength (MPa) |
|---|---|---|---|---|---|
| Example 12 | 1.08 | 30.7 | 535 | 96.0 | 30.8 |
| Example 13 | 0.95 | 28.8 | 461 | 96.3 | 29.7 |
| Example 14 | 0.98 | 32.9 | 535 | 59.4 | 20.1 |
| Comparative Example 4 | 0.76 | 28.1 | 241 | — | 5.4 |
| Example 15 | 0.78 | 28.6 | 431 | 50.5 | 10.4 |

*The ratio of diacyloxy aromatic compound (C) compounded is mol % to the total amount of polyester (A) and acyloxy aromatic carboxylic acid (B).

The evaluation test results of the fiber are shown in Table 2.

a. Mechanical Strength

The tensile strength and modulus in tension of the fiber having a diameter of 0.4 mm were measured under a condition of a temperature of 23° C, stress rate of 5 mm/min and the distance between clamps at 100 mm, using a tensile testing machine (DCS-2000 of Shimadzu Seisakusho).

b. Toughness

The knot strength and loop strength of the same fiber as used for measuring mechanical strength, were measured in accordance with JIS L1013, which are considered to be indicators of toughness.

EXAMPLE 13

The procedure of Example 12 was repeated except that each prescribed amount of polyethylene terephthalate, p-acetoxy benzoic acid and 4,4'-diacetoxybenzophenone (hereinafter referred to as $C_2$) were used, to obtain an aromatic polyester, which was then evaluated. The results are shown in Table 2.

EXAMPLE 14

The procedure of Example 12 was repeated except that each prescribed amount of polyethylene terephtharate, p-acetoxy benzoic acid and anhydrous p-acetoxy benzoic acid (hereinafter referred to as $C_3$) are used, to obtain an aromatic polyester, which was then evaluated. The results are shown in Table 2.

EXAMPLES 15 and 16

An aromatic polyester was produced in the same manner as in Example 12 except that polyethylene terephthalate, p-acetoxy benzoic acid and 1,4-diacetoxy benzene were used in the prescribed amounts, and the resulting aromatic polyester was evaluated. The results are shown in Table 2.

What is claimed is:

1. A process for producing aromatic polyester which comprises mixing
   5 to 70 mol % (as calculated by converting the repeating unit mentioned below into one molecule) of polyester (A) with the repeating unit represented by general formula (I),

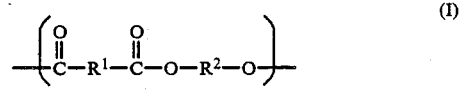

and 95 to 30 mol % of an acyloxyl aromatic carboxylic acid (B),
   with 0.1 to 20 mol % based on the total amount of (A) and (B), of a diacyloxy aromatic compound (C) represented by general formula (II),

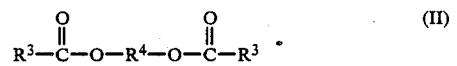

and reacting the resulting mixture;
   wherein $R^1$ represents an aromatic bivalent radical with 6 to 20 carbon atoms, $R^2$ is selected from the group of an aliphatic bivalent radical with 2 to 20 carbon atoms, an alicyclic bivalent radical with 4 to 20 carbon atoms, an aromatic bivalent radical with 6 to 20 carbon atoms and poly(alkylene oxide) bivalent radical with a molecular weight of 200 to 8000, $R^3$ represents an alkyl radical with 1 to 8 carbon atoms, and $R^4$ is selected from the group of

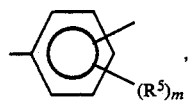

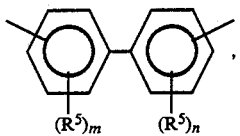 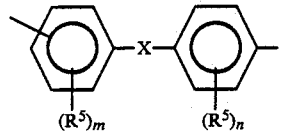

and

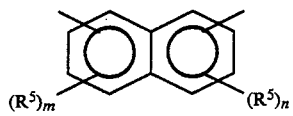

(wherein R⁵ is selected from the group of a hydrogen atom, a halogen atom, an alkyl radical with 1 to 4 carbon atoms and an alkoxy radical with 1 to 4 carbon atoms, m and n are independently an integer of 1 to 4, and X is selected from the group of —(CH$_2$)—, —(CH$_2$)$_2$—, —CH(CH$_3$)—, —CH(C$_2$H$_5$)—, —CH(CH$_3$)$_2$—, —CH(C$_2$H$_5$)$_2$—, —O—,

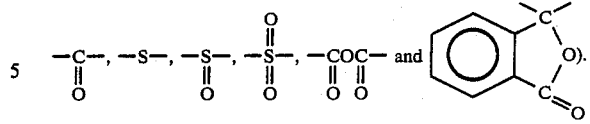

2. A process as claimed in claim 1 wherein polyester (A) is polyethylene terephthalate, polubutylene terephthalate, poly-p-phenylene terephthalate or polyethylene naphthalate.

3. A process as claimed in claim 1 wherein polyester (A) is polyethylene terephthalate.

4. A process as claimed in claim 1 wherein acyloxy carboxylic acid (B) is acetoxy benzoic acid, propionyloxy benzoic acid, butylyloxy benzoic acid or isobutylyloxy benzoic acid.

5. A process as claimed in claim 1 wherein the diacyloxy aromatic compound (C) is 1,4-diacetoxy benzene, diacetoxy toluene, diacetoxy chlorobenzene, diacetoxy methoxy benzene, 4,4'-diacetoxybiphenyl, 2,2'-dimethyl-4,4'-diacetoxybiphenyl, 3,3'-dimethoxy-4,4'-diacetoxybiphenyl, bis(4-acetoxybiphenyl, 3,3'-dimethoxy-4,4'-diacetoxybiphenyl, bis (4-acetoxyphenyl) methane, bis(4-acetoxyphenyl)ethane, 2,2-bix(4-acetoxyphenyl) propane, 4,4'-diacetoxydiphenylether, 4,4'-diacetoxy-benzophenone, 4,4'-diacetoxydiphenylsulfone, p-acetoxydiphenylsulfoxide, 4,4'-diacetoxydiphenylsulfone, p-acetoxybenzoic acid anhydride, phenolphthalein diacetate, 4,4'-dimethyl-3,3'-diacetoxydiphenylether, 2,4 '-dichloro-3,3'diacetoxydiphenylether, 4,4'-diacetory-pb 3,3', t,t '-tetramethydiphenylsulfone, 1,4-diacetoxynaphthalene, 1,5-diacetoxy-naphthalene, 1,6-diacetoxynaphthalene, 2,7-diacetoxy-naphthalene, 1-chloro-2,6-diacetoxynaphthalene, 1-methyl-2,6-diacetoxynaphthalene or 1-methoxy-2,6-diacetoxynaphthalene.

* * * * *

UNITED STATES PATENT AND TRADEMARK OFFICE
CERTIFICATE OF CORRECTION

PATENT NO. : 4,892,912

DATED : January 9, 1990

INVENTOR(S) : HAYASHI et al

It is certified that error appears in the above-identified patent and that said Letters Patent is hereby corrected as shown below:

Column 14, lines 24-25 (Claim 5), delete the following:

"bis (4-acetoxyphenyl), 3,3'-dimethoxy-4,4'-diacetoxybiphenyl,"

Column 14, line 28 (Claim 5), following "benzophenone", insert:

--4,4'-diacetoxydiphenylsulfone, 4,4'-diacetoxydiphenyl-sulfoxide--.

Column 14, line 33 (Claim 5), change "t,t" to --5,5'--.

Column 14, line 26, after ethane, 2,2- delete "bix" and insert --bis--.

Column 14, line 29, delete "P-acetoxydiphenylsufoxide".

Column 14, line 33, after "diacetory: delete --pb--.

Signed and Sealed this

Twenty-eighth Day of July, 1992

*Attest:*

DOUGLAS B. COMER

*Attesting Officer*    *Acting Commissioner of Patents and Trademarks*